UNITED STATES PATENT OFFICE.

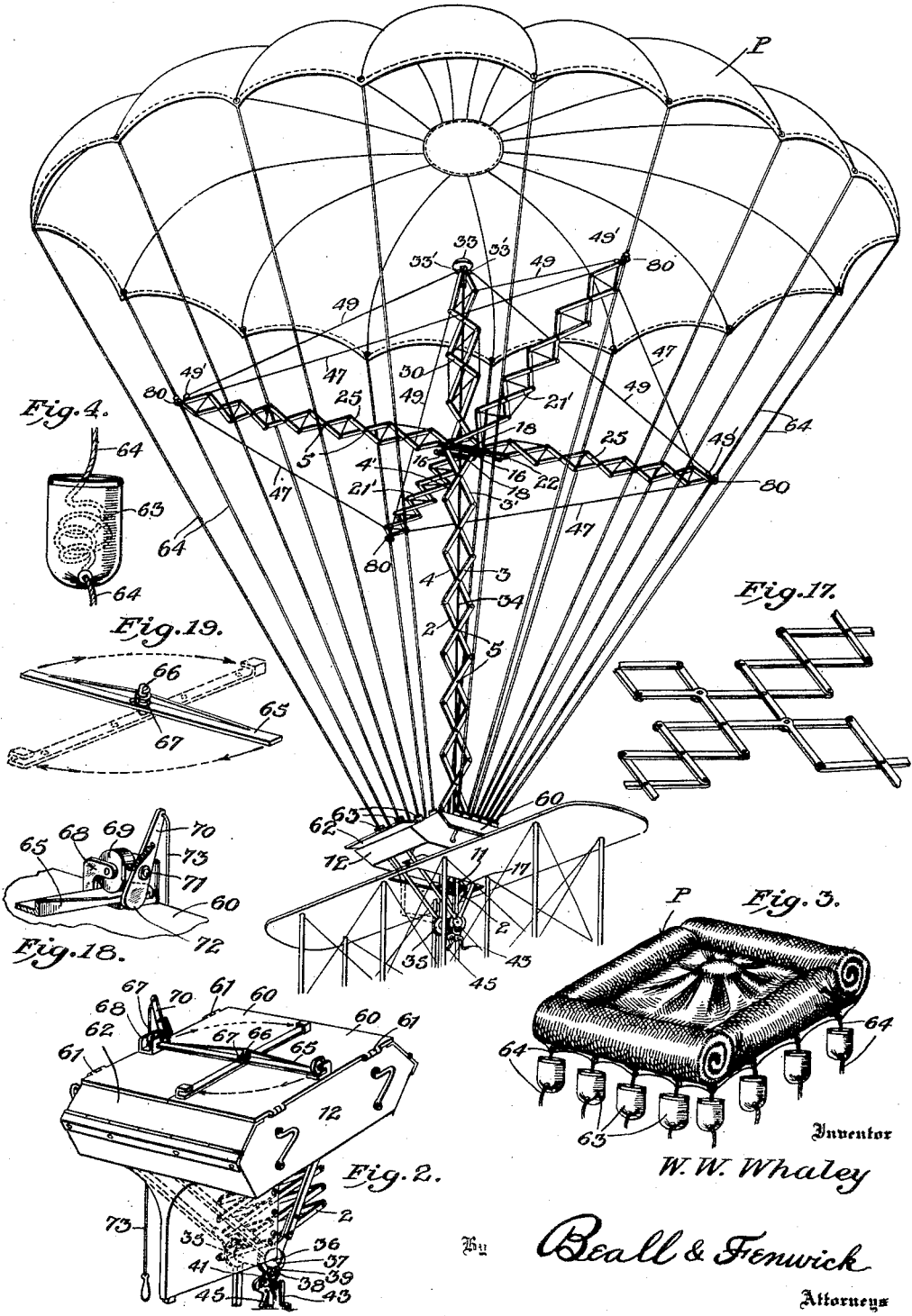

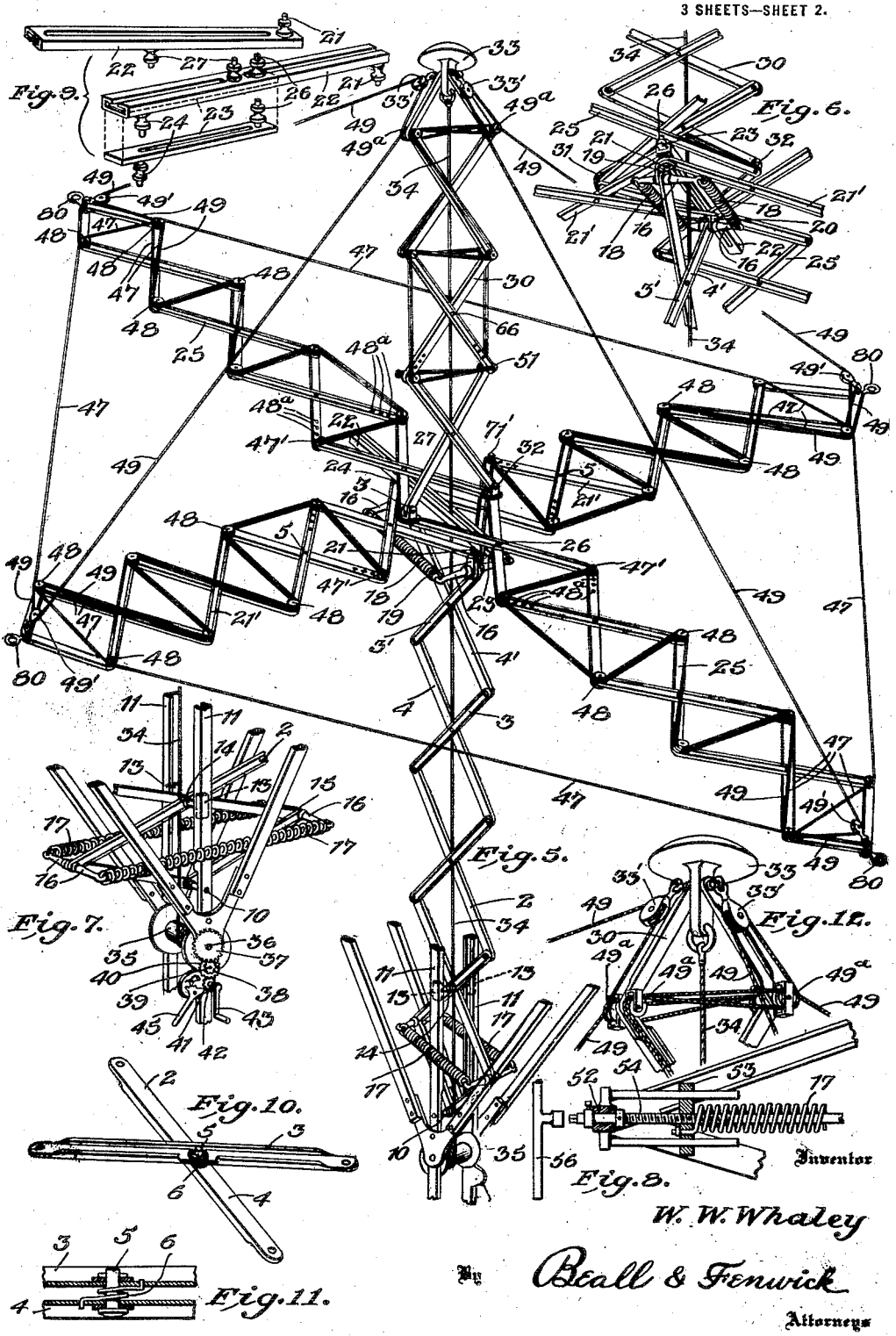

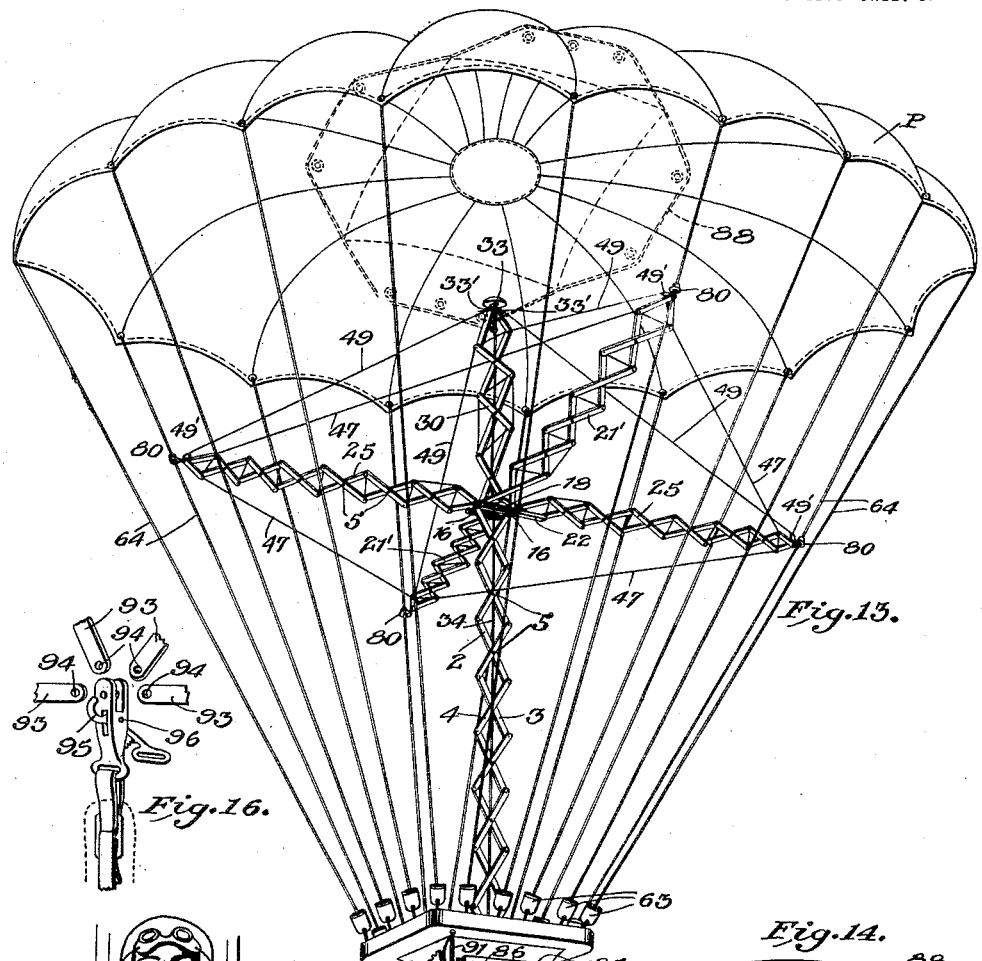
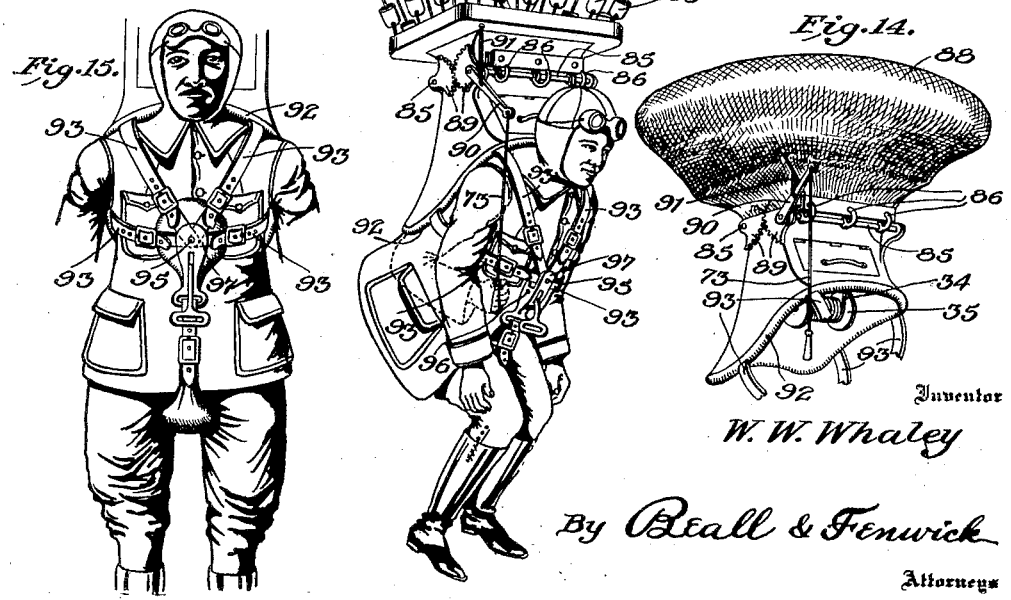

WINFRED WILLIAM WHALEY, OF WILMINGTON, NORTH CAROLINA, ASSIGNOR OF ONE-HALF TO LEWIS E. WHALEY, OF LUMBERTON, NORTH CAROLINA.

PARACHUTE.

1,319,546.  Specification of Letters Patent.  Patented Oct. 21, 1919.

Application filed November 29, 1918. Serial No. 264,760.

*To all whom it may concern:*

Be it known that I, WINFRED W. WHALEY, a citizen of United States, residing at Wilmington, in the county of New Hanover and State of North Carolina, have invented certain new and useful Improvements in Parachutes; and I do hereby declare the following to be a full, clear, and exact description of the invention, such as will enable others skilled in the art to which it appertains to make and use the same.

This invention relates to aerial apparatus, and more particularly to an aviator's safety apparatus.

It is one of the objects of the present invention to provide an apparatus readily applicable or adaptable either to airplanes or to aviator's bodies so as to control the descent or an airplane or the descent of an aviator thrown or jumping therefrom when the apparatus is applied.

It is another object of the present invention to provide in combination with a suitably constructed proportioned parachute, means, which while disconnected from the parachute, will operate with rapidity and a reliability to distend the parachute so as to cause it to rapidly open, and therefore to quickly check the descent of aerial apparatus, or of an aviator to which the safety appliance may be attached, it being an especial object of the invention to provide means which will be quickly opened in cases of emergency so as to afford the safe alighting of the aerial machine or the aviator when the same may start its precipitate descent from or at a comparatively low altitude. A further object of the invention is to provide in combination a carrying device or receiver provided with automatically expansible and manually controlled means operative when released to quickly unfurl a parachute, which is adapted to be compactly arranged in the carrier or receiver, and furled about the expanding means, which latter are disconnected from the parachute proper. Another object of the invention is to provide a safety parachute apparatus having means for readily connecting it to the fuselage and top plane of an airplane, and having a carrier or casing designed to offer a minimum resistance to the air, and which is provided with a quick-acting and a reliable restraining means adapted to be released by the aviator when it is desirable to distend the parachute so that it will operate to suspend the airplane and cause its gradual descent, and a further object of the invention is to provide means for controlling the retraction or contraction of the parachute distending means without affecting the parachute, and while the latter is distended and floating with its burden.

Among the other objects of the invention, a further purpose is to provide for the ready attachment of the automatically opening safety apparatus to the person of an aviator, and to provide for the instantaneous release of the safety apparatus as may be desirable in instances such as when the aviator is being carried by the parachute toward some obstacle to which he may cling if released from the parachute, and therefore prevent him from being carried farther, or to permit him to release himself instantly as soon as he reaches a suitable landing place and thereby avoid his being dragged by the floating parachute and also to enable him to instantly release himself, if desired, when he is in proximity to a body of water in which it might be desirable to alight.

With these and other objects in view, the invention consists of the construction, the combination, and in details and arrangements of parts as more particularly set forth in the following specification with relation to the embodiments illustrated in the accompanying drawings, in which—

Figure 1 is a perspective view of the apparatus, as organized for use in combination with an airplane.

Fig. 2 is a perspective view of the carrier or receiver for the compacted parachute and its extending means disconnected from the airplane.

Fig. 3 is a perspective view showing the furled parachute and the rope-receiving pockets for the ropes attached to the margin of the parachute, this organization being removed from its casing.

Fig. 4 is a detailed perspective view of one of the rope pockets.

Fig. 5 is a detailed perspective view of the extended lazy-tongs organization, which is utilized to distend the parachute.

Fig. 6 is an underneath perspective view of the lazy-tongs structure, illustrating particularly the connections between the upright lazy-tongs unit and the horizontal members thereof.

Fig. 7 is a detailed perspective view of the winding apparatus for contracting the vertical lazy-tong unit, and illustrating one set of the springs for extending the unit.

Fig. 8 is a detailed sectional view of means for varying the tension of the lazy-tong springs.

Fig. 9 is a perspective view of the assembled and disassembled guide and slide members illustrated in Fig. 6, to which the lazy-tong organization is attached.

Fig. 10 is a perspective view showing a connected pair of the lazy-tong links, one of which is broken away.

Fig. 11 is a detailed sectional view of a pair of the lazy-tong links showing the opening spring about their pivot pin.

Fig. 12 is a detailed perspective view of the cap-piece of the top section of the lazy-tong unit.

Fig. 13 is a perspective view of the apparatus shown as adapted for use or attachment to the person of an aviator.

Fig. 14 is a detailed view of the compacted and covered parachute, and the tripping means therefor provided with means for attachment to the person of the aviator.

Fig. 15 is a perspective view of the harness for attaching the device of Fig. 14 to the person of the aviator.

Fig. 16 is a detailed perspective view showing the trip mechanism for releasing the aviator's harness.

Fig. 17 is a detailed perspective view of a modified form of the lateral lazy-tong arms.

Fig. 18 is a detail perspective of the tripping device.

Fig. 19 is a detail perspective of the locking bar.

It is desirable, as is well known, to secure the complete distention of a parachute as rapidly as possible after it has been released from the apparatus to which it may be connected so as to check the rapidity of descent as soon as possible, more especially when the necessity for the use of a parachute occurs at a comparatively low altitude within the distance of which a parachute of ordinary construction, without some mechanical assistance, would fail to open and check the descent of the aviator, or any apparatus connected to the parachute, before serious results could occur, and to secure the rapid and effective distention of the parachute either when it is connected to an airplane or other apparatus, or directly to the body of the person of the aviator, I have devised a means for automatically and quickly effecting the opening of the parachute, and which means comprises a group or organization of lazy-tong members for a clear comprehension, of which attention is directed to Figs. 5 and 7, in which what is termed as the elevating lazy-tong unit, is designated at 2, and which comprises a plurality of links 3—4 pivoted centrally together on a pivot 5, Fig. 10, about which pivot is wound a spring 6, the ends of which are connected to the links 3—4 so as to tend to normally sling the links open about their pivot. The lowermost links of the unit 2 are shown as attached to a fixed pivot 10, mounted in fixed standards or guides 11, forming a part or rigidly connected to a carrier or receiving structure generally indicated at 12. Mounted within or on the guides 11 is a cross-head or slide 13, which is connected pivotally to a pair of the crossed lazy-tong links, as at 14, and opposite joints, as 15 of a pair of lazy-tong links, are provided with pins 16 carrying transversely extending contractile springs 17, the function of which, obviously is to draw the transversely opposite joints 15 toward each other, and thus cause the extension vertically of the lazy-tong unit 2 with respect to the carrier or receiver 12.

At the upper end of the elevating unit 2, there is provided a pair of pins 16, one in the outer and upper end of links 3'—4', these pins being connected by contractile springs 18, also tending to draw the swinging ends of the links 3'—4' toward each other, to extend the elevating unit 2.

Extending upwardly from the link 3' there is a connection or bracket 19, and extending upwardly from the swinging end of the link 4' there is a bracket 20, the bracket 19 being connected by a pin 21, to an adjacent joint at the swinging ends of the connected pair of links of a horizontally disposed lazy-tong set 21', which extends beneath a guide 22, in which is movable a slide 23, having a downwardly extending pin 24, which is connected to the joint of the lower lazy-tong set 21', which is opposite to the joint to which the pin 21, entering the bracket 19, is connected. This pin 21 extends downwardly from and is secured to the end of the slide 22. It will be seen from this that when the upper ends of the links 3'—4' move toward each other under the tension of the springs 18, the slide 23 moves in on the guide 22 so that pin 24 approaches pin 21, Fig. 9, as the lazy-tongs unit 2 is extended, and therefore the opposite joints of the lower lazy-tong set 21' are moved toward each other, and this set 21' is extended and in a plane at right angles to the vertically moving unit 2. Another or upper horizontal lazy-tong set is shown at 25, one of its pivoted joints between the ends of a pair of links being mounted on a pin 26, extending up from the slide 23, and the longitudinally opposite joint is mounted on the pin 27, extending up from and fixed in the guide 22, so that when the pins 26 and 27 move toward each other, the horizontal lazy-tong arm or set 25 is collapsed, and when the pins 26 and 27 move away from each other the lazy-tong set 25 is extended.

An additional or extension unit is arranged vertically above the unit 2, and is illustrated as at 30, the lower end of the extension unit 30 being connected at joints 31 and 32 to transversely opposite end joints of the outer horizontal set 25, so that when this set is extended a similar motion will be imparted to the top unit 30.

At the top of the upper unit 30 there is arranged a cap-piece 33, to which is connected a winding cable or cord 34, which extends down and is connected to a drum 35, having suitable bearing in the receiver or carrier 12, and is mounted on the shaft 36, having a gear 37 engaging a pinion 38, secured on the shaft 39, which also carries a larger gear 40, adapted to be engaged by a pinion 41 mounted on the crank shaft 42, which is slidably mounted in the framework, and is provided with a crank 43. The winding pinion 41 is normally disengaged from the intermediate gear so as to allow the same to spin, when the above-described lazy-tong organization is released for automatic extension, and when the operator desires to retract the lazy-tong organization, or throws a coupling lever 45, which lifts the shaft 42 so as to carry the pinion 41 in which mesh with the gear 40, the lever 45 being provided with a pawl and rack lock 46.

For the purpose of varying the tension of the contractile springs 17, there is shown in Fig. 8 a means comprising a guide 52 mounted on one of the pins 16, for instance on which guide there is slidably a nut 53, to which is connected one end of the spring 17, the nut being engaged by a screw 54 turnably mounted in the pin 16, and having a head 55 engaged and turned by a wrench 56.

In Fig. 1 the parachute is shown as provided with a receiver 12 in the form of a casing or box having a pair of cover sections 60, hinged at 61 to parallel sides of the box, so that sections may be folded together across the box, which is provided with end cover sections 62, also hinged to the box.

In the use of my apparatus, the lazy-tong group is adapted to be contracted into a small space in the receiver or carrier, and enveloped in a parachute P of suitable construction and size, and compactly arranged within the carrier or receiver 12, which may be provided with a plurality of pockets 63 designed to receive the guy ropes 64 connected to the margin of the parachute and having contractile mouths. When the parachute and its expanding means are compacted within the carrier or casing 12, the covers 60—62 are closed over to restrain the extension of the lazy-tongs and are locked by means of a lever 65, which is centrally pivoted on a pin 66, about which may be arranged a spring 67, Fig. 19, the ends of the lever 65 being adapted to engage suitable keepers 68, located at the pivoted edges of the covers 60, and therefore being disposed transversely to the covers, as shown in Fig. 2, when the covers are locked. The keepers 68 may comprise rollers 69, under which the ends of the lever 65 may swing to a limited position in which the lever is locked by a tripping device comprising a dog 70, Fig. 18 pivoted at 71, and having its operative end 72 designed to swing down along the edge of the lever, as shown in Fig. 18. The lever or dog 70 is provided with a pull-cord 73, which is extended to a convenient position within reach of the aviator, when the carrier or casing 12 is shown as mounted upon an airplane, as in Fig. 1, so that when the emergency requires, the aviator has but to pull on the cord 73 to actuate the dog 70, as to release the lever 65, which under the impulse of its spring 67 will swing around away from the keepers 68, and permit the free expansion of the contracted lazy-tongs, and thereby the projection of the parachute P from the casing or carrier, the lazy-tongs in extending vertically elevating the parachute clear of the casing, and by the horizontal arms laterally unfurling the parachute so that it quickly assumes the floating or suspending shape. Preferably the lazy-tong organization is disconnected from the parachute proper, but the ends of the horizontal arms may be provided with eyes 80, Fig. 1, to engage adjacent guy ropes 64, so as to steady the extended lazy-tong structure.

My automatically expansible parachute may be readily adopted for direct adjustment to the person of an aviator, as is clearly shown in Figs. 13 and 15, and in this case the carrier 12 made in the form of a box or receiver having extending along its parallel sides, as clearly shown in Fig. 14, a pair of rock shafts 85, with a plurality of hooks 86, designed to engage a perforated binding strip 87 attached to corners of a cover 88, so that the compacted parachute and lazy-tongs may be covered and secured in collapsed position when the rock shaft 85 is turned so that its hooks 86 enter apertures provided therefor in the edges of the cover. The rock shafts 85 are provided at one end of each with meshing gears 89, and one of the shafts has a lever 90 connected by a spring 91 to the stationary part of the carrier, the function of the spring having to throw the rock shafts 85 with the hooks 86 into fastening engagement with the cover 88. The outer end of the lever 90 is provided with a pull cord 91 extending forwardly over the shoulder of the aviator, as shown in Fig. 13, so that when he is equipped with one of the parachutes, and desires to use the same in his descent, it is only necessary to pull the lever 90 so as to disengage the hooks 86 from the engaged portions of the cover 88. The receiver shown in Figs. 13 and 14, is provided at its bottom with a portion 92 having a series of shoulder and breast straps 93, which are designed to be passed around to the chest of the aviator, so that rings or other eye-portions 94, at the ends of the straps, can be engaged by a hook 95 pivoted at 96 in a yoke 97, and in the event of necessity the aviator has simply to pull the hook 95 to disengage the harness forming straps which secures the back-piece 92 to the back of the aviator, whereby the parachute may be instantly disconnected from the body of the aviator. For the purpose of steadying the extended horizontal arms ropes 47 are rove from one to the next at the outer ends and thence zig-zag around guide pulleys 48 the ends of the ropes being secured at 47' on the inner portion of the arms so that when the arms are contracted the slack of the rope will be taken up on opposite pulleys 48 separate. Suspension guys 49 are also attached at one end of each to the arms and are rove around the pulleys 48 and up over sheaves 49' either to the top pulleys 33' or guide pulleys 49ᵃ on the extension unit 30, thence zig-zag down the part 33. Therefore, when the lazy tongs collapse the slackened rope is taken up and when they extend the rope is made taut. For the purpose of varying the position of certain of the slack pulleys 48 the link may be provided with apertures 48ᵃ at any of which the pulleys may be set.

What I claim is:

1. An aviator's safety apparatus comprising a parachute, a series of guy ropes attached to the margin of the parachute, a carrier device to which the ropes are attached at their lower ends, and laterally and vertically expansible means mounted upon and compactible into said device and connected to said ropes for automatically distending the parachute.

2. An aviator's safety apparatus comprising a parachute, a series of guy ropes attached to the margin of the parachute, a carrier device to which the ropes are attached at their lower ends, and laterally and vertically expansible means compactible into said device for automatically distending the parachute, said means having no connection with the parachute proper.

3. An aviator's safety apparatus comprising a parachute, a series of guy ropes attached to the margin of the parachute, a carrier device to which the ropes are attached at their lower ends, and laterally and vertically expansible means compactible into said device for automatically distending the parachute, said means comprising variable length arm-like units connected at their outer ends to said ropes.

4. An aviator's safety apparatus comprising a parachute, a series of guy ropes attached to the margin of the parachute, a carrier device to which the ropes are attached at their lower ends, and laterally and vertically expansible means compactible into said device for automatically distending the parachute, said means comprising variable length arm-like units connected at their outer ends to said ropes, certain of the arms operatively connected at their inner ends, and one of said units forming an elevator for the connected arms.

5. An aviator's safety apparatus comprising a parachute, a series of guy ropes attached to the margin of the parachute, a carrier device to which the ropes are attached at their lower ends, and laterally and vertically expansible means compactible into said device for automatically distending the parachute, manually operable means for retracting said expanding means without the contraction of the parachute.

6. An aviator's safety apparatus comprising a parachute, a series of guy ropes attached to the margin of the parachute, a carrier device to which the ropes are attached at their lower ends, and laterally and vertically expansible means compactible into said device for automatically distending the parachute, manually operable means for retracting said expanding means without the contraction of the parachute and while it is floating.

7. An aviator's safety apparatus comprising a parachute, a series of guy ropes attached to the margin of the parachute, a carrier device to which the ropes are attached at their lower ends, and laterally and vertically expansible means compactible into said device for automatically distending the parachute, said means comprising variable length arm-like units connected at their outer ends to said ropes, certain of the arms operatively connected at their inner ends, and one of said units forming an elevator for the connected arms and manually operable trip means for releasing the compacted parachute and its distending means.

8. An aviator's safety apparatus comprising a parachute, a series of guy ropes attached to the margin of the parachute, a carrier device to which the ropes are attached at their lower ends, and laterally and vertically expansible means compactible into said device for automatically distending the parachute, said means comprising variable length arm-like units connected at their outer ends to said ropes, certain of the arms operatively connected at their inner ends, and one of said units forming an elevator for the connected arms and manually operable trip means for releasing the compacted parachute and its distending means, said carrier having cover forming means and the trip means engageable with the cover forming means of the carrier device.

9. An aviator's safety apparatus comprising a parachute, a series of guy ropes attached to the margin of the parachute, a carrier device to which the ropes are connected, a vertically extensible lazy-tong unit mounted in and attached to the carrier and having adjacent its movable end a set of radiating lazy-tong arms, means for automatically extending the lazy-tong members, and a manually controlled means for restraining the compacted lazy-tongs, which latter when released expand in the parachute and unfurl the same, said arms being connected to the guy ropes, so as to steady the expanded arms and unit.

10. An aviator's safety apparatus comprising a parachute, a series of guy ropes attached to the margin of the parachute, a carrier device to which the ropes are connected, a vertically extensible lazy-tong unit mounted in and attached to the carrier and having adjacent its movable end a set of radiating lazy-tong arms, means for automatically extending the lazy-tong members, and a manually controlled means for restraining the compacted lazy-tongs, which latter when released expand a winding mechanism connected to the carrier and a connection between said mechanism and the said unit whereby the aviator may contract the same.

11. An aviator's safety apparatus comprising a parachute, a series of guy ropes attached to the margin of the parachute, a carrier device to which the ropes are connected, a vertically extensible lazy-tong unit mounted in and attached to the carrier and having adjacent its movable end a set of radiating lazy-tong arms, means for automatically extending the lazy-tong members, and a manually controlled means for restraining the compacted lazy-tongs, which latter when released expand a winding mechanism connected to the carrier and a connection between said mechanism and the said unit whereby the aviator may contract the same, while the parachute is still floating without contracting the parachute.

12. An aviator's safety device comprising a carrier or receiver; an expansible lazy-tong unit attached to said carrier and having near its free end a set of radiating lazy-tong arms all connected for automatic extension, a parachute attached to the carrier and adapted to be furled compactly about the contracted lazy-tong members so that when the latter expands the parachute is unfurled, the parachute being connected to the carrier by ropes which are engaged by the said arms.

13. An aviator's safety device comprising a carrier or receiver; an expansible lazy-tong unit attached to said carrier and having near its free end a set of radiating lazy-tong arms all connected for automatic extension, a parachute attached to the carrier and adapted to be furled compactly about the contracted lazy-tong members so that when the latter expands the parachute is unfurled, the parachute being connected to the carrier by ropes which are engaged by the said arms, the carrier including a casing having stream line front and rear faces to reduce resistance when the apparatus is applied to an airplane.

14. An aviator's safety device comprising a carrier or receiver; an expansible lazy-tong unit attached to said carrier and having near its free end a set of radiating lazy-tong arms all connected for automatic extension, a parachute attached to the carrier and adapted to be furled compactly about the contracted lazy-tong members so that when the latter expands the parachute is unfurled, the parachute being connected to the carrier by ropes which are engaged by the said arms, the carrier comprising a casing having foldable cover members hinged to its sides, a restraining lever pivoted centrally of its length to the swinging edge of a cover member and turnable transversely to the axis of the cover member and engaging, at its ends, keepers, and a manually controlled trip for releasing the lever to permit the parachute and its expanding arms to be projected from the casing.

15. The combination in an aviator's safety device, of a parachute, a carrier having ropes attached to the margin of the parachute, rigid guides attached to the carrier, a lazy-tong unit forming an elevator attached at its lower or inner end to said guide and having a slide running in the guides, transverse springs connecting transversely opposite joints of the unit for automatically extending the same, and radially expansible means adjacent the upper end of the unit automatically operative with and by the extension of the said unit, whereby the parachute will be unfurled and distended when the unit is released for operation.

16. The combination in an aviator's safety device, of a parachute, a carrier having ropes attached to the margin of the parachute, rigid guides attached to the carrier, a lazy-tong unit forming an elevator attached at its lower or inner end to said guide and having a slide running in the guides, transverse springs connecting transversely opposite joints of the unit for automatically extending the same, and radially expansible means adjacent the upper end of the unit automatically operative with and by the extension of the said unit, whereby the parachutes will be unfurled and distended when the unit is released for operation, said means comprising two sets of lazy-tongs, one set having a cross-link pivoted on one joint and a slide pivoted on the opposite joint and to which link and slide the upper end of the upright lazy-tong is attached so that as the ends of the terminal links thereof spread and close the horizontal set attached thereto is similarly actuated.

17. The combination in an aviator's safety device, of a parchute, a carrier having ropes attached to the margin of the parachute, rigid guides attached to the carrier, a lazy-tong unit forming an elevator attached at its lower or inner end to said guide and having a slide running in the guides, transverse springs connecting transversely opposite joints of the unit for automatically extending the same, and radially expansible means adjacent the upper end of the unit automatically operative with and by the extension of the said unit, whereby the parachute will be unfurled and distended when the unit is released for operation, said means comprising two sets of lazy-tongs, one set having a cross-link pivoted on one joint and a slide pivoted on the opposite joint and to which link and slide the upper end of the upright lazy-tong is attached so that as the ends of the terminal links thereof spread and close the horizontal set attached thereto is similarly actuated, the other set of lazy-tongs arranged at right angles to the first and also connected to the link and slide at opposite points so that it will be extended and contracted concurrently with the upright unit and the first named set.

18. The combination in an aviator's safety device, of a parachute, a carrier having ropes attached to the margin of the parachute, rigid guides attached to the carrier, a lazy-tong unit forming an elevator attached at its lower or inner end to said guide and having a slide running in the guides, transverse springs connecting transversely opposite joints of the unit for automatically extending the same, and radially expansible means adjacent the upper end of the unit automatically operative with and by the extension of the said unit, whereby the parachute will be unfurled and distended when the unit is released for operation, said means comprising two sets of lazy-tongs, one having a cross-link pivoted on one joint and a slide pivoted on the opposite joint and to which link and slide the upper end of the upright lazy-tong is attached so that as the ends of the terminal links thereof spread and close the horizontal set attached thereto is similarly actuated, the other set of lazy-tongs arranged at right angles to the first and also connected to the link and slide at opposite points so that it will be extended and contracted concurrently with the upright unit and the first named set, and an extension or top lazy-tong member connected at its lower end to opposite points of one of the sets of the horizontal or spreader lazy-tongs.

19. The combinaion in an aviator's safety device, of a parachute, a carrier having ropes attached to the margin of the parachute, rigid guides attached to the carrier, a lazy-tong unit forming an elevator attached at its lower or inner end to said guide and having a slide running in the guides, transverse springs connecting transversely opposite joints of the unit for automatically extending the same, and radially expansible means adjacent the upper end of the unit automatically operative with and by the extension of the said unit, whereby the parachute will be unfurled and distended when the unit is released for operation, said means comprising two sets of lazy-tongs, one having a cross-link pivoted on one joint and a slide pivoted on the opposite joint and to which link and slide the upper end of the upright lazy-tong is attached so that as the ends of the terminal links thereof spread and close the horizontal set attached thereto is similarly actuated, the other set of lazy-tongs arranged at right angles to the first and also connected to the link and slide at opposite points so that it will be extended and contracted concurrently with the upright unit and first named set, and an extension or top lazy tong member connected at its lower end to opposite joints of one of the sets of horizontal or spreader lazy tongs, the radial arms of the group having guy ropes rove thereon and connected to the top of the extensive member.

20. The combination in an aviator's safety device, of a parachute, a carrier attached thereto, a lazy tong unit mounted on the carrier, a pair of crossed lazy tong members disposed transverse to the length of the unit and all operatively connected for automatic extension, the arms of the transverse members being connected in pairs by steady ropes so rove on respective arms that when the arms are extended the ropes are made taut and when the arms are collapsed the slackened rope is taken up.

21. The combination in an aviator's safety device, of a parachute, a carrier attached thereto, a lazy tong unit mounted on the carrier, a pair of crossed lazy tong members disposed transverse to the length of the unit and all operatively connected for automatic extension, the arms of the transverse members being connected in pairs by steady ropes so rove on respective arms that when the arms are extended the ropes are made taut and when the arms are collapsed the slackened rope is taken up, and other guy ropes laced on the arms and on the top portion of the unit to support the outer ends of the arms.

In testimony whereof I affix my signature.

WINFRED WILLIAM WHALEY.